(12) United States Patent
Xiang et al.

(10) Patent No.: US 9,614,646 B2
(45) Date of Patent: Apr. 4, 2017

(54) METHOD AND SYSTEM FOR ROBUST MESSAGE RETRANSMISSION

(71) Applicant: VMware, Inc., Palo Alto, CA (US)

(72) Inventors: Enning Xiang, San Jose, CA (US); Jorge Guerra Delgado, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/664,497

(22) Filed: Mar. 20, 2015

(65) Prior Publication Data

US 2016/0277152 A1    Sep. 22, 2016

(51) Int. Cl.
    *H04L 1/18*    (2006.01)
(52) U.S. Cl.
    CPC .......... *H04L 1/1848* (2013.01); *H04L 1/1854* (2013.01); *H04L 1/1874* (2013.01); *H04L 1/1896* (2013.01)
(58) Field of Classification Search
    CPC ............................... H04L 1/08; H04L 1/1607
    See application file for complete search history.

(56) References Cited

U.S. PATENT DOCUMENTS

| | | | | |
|---|---|---|---|---|
| 6,335,933 B1* | 1/2002 | Mallory | ................ | H04L 1/1635 370/394 |
| 2003/0123447 A1* | 7/2003 | Smith | ..................... | H04L 47/10 370/394 |
| 2005/0094632 A1* | 5/2005 | Hebsgaard | ............ | H04L 1/0083 370/389 |
| 2006/0256803 A1* | 11/2006 | Nakata | .................. | H04L 1/1887 370/412 |
| 2007/0097982 A1* | 5/2007 | Wen | ....................... | H04L 1/1841 370/394 |
| 2013/0329573 A1* | 12/2013 | Chen | ..................... | H04L 1/1806 370/246 |

* cited by examiner

*Primary Examiner* — Sam Rizk
(74) *Attorney, Agent, or Firm* — Patterson & Sheridan LLP

(57) ABSTRACT

Techniques are disclosed for message retransmission. In one embodiment, an agent in a distributed system that receives and/or relays messages from a master node identifies messages that have not been successfully delivered, and adds a stub for each such message to a message queue. The agent then requests retransmission of missing messages in the message queue and sets flags associated with the message stubs to indicate that retransmission requests have been sent. If one (or more) of the messages cannot be retransmitted, the master node sends acknowledgment message(s) notifying the agent of the master node's inability to retransmit the messages. The agent then resets the flags corresponding to those messages to indicate that retransmission request(s) need to be sent again.

20 Claims, 4 Drawing Sheets

METHOD AND SYSTEM FOR ROBUST MESSAGE RETRANSMISSION

BACKGROUND

Message retransmission refers to the resending of messages which have not been successfully delivered. In a distributed system having multiple host servers communicating with each other, such as a master node that distributes messages to agents (which may themselves relay the messages to other agents), message retransmission techniques are often employed in an attempt to guarantee successful message delivery. For example, in a distributed storage area network, messages pertaining to the distributed storage area network's cluster directory, which stores information on the state of the cluster and the health of disks and nodes, may be sent between cluster nodes and retransmitted, as appropriate, so that the nodes have a consistent view of such cluster directory information.

Traditional message retransmission techniques can lack robustness. During retransmission, the message may fail to be delivered again. For example, the master node may be out of memory and unable to process the retransmission request. As a result, some messages may not be received by the agents, thus making those agents fall out of sync with the master, resulting in an unstable distributed system. To ensure such consistency, the agent may be removed from and rejoined to the cluster, with a snapshot of, e.g., the current cluster directory being copied to the rejoined server. However, a large amount of network traffic may be required to send such a snapshot and the cluster service may also need to be temporarily halted.

SUMMARY

One embodiment provides a computer-implemented method for message retransmission. The method generally includes determining that a message in a sequence of messages has not been received, and adding, to a message queue, a stub corresponding to the message that has not been received. The method further includes requesting retransmission of the message that has not been received, wherein a flag associated with the stub corresponding to the message is set to indicate that the retransmission request has been sent. In addition, the method includes, if an acknowledgment message is received indicating the message cannot be retransmitted, resetting the flag to indicate that another retransmission request needs to be sent.

Further embodiments of the present invention include a non-transitory computer-readable storage medium storing instructions that when executed by a computer system cause the computer system to perform the method set forth above, and a computer system programmed to carry out the method set forth above.

DETAILED DESCRIPTION

Embodiments presented herein provide message retransmission techniques that handle message retransmission failure in a robust manner. In one embodiment, an agent in a distributed system that receives and/or relays messages from a master node is configured to identify messages that have not been successfully delivered, and to add a stub for each such message to a message queue. In a particular embodiment, the master node may assign a sequence identifier (ID) number to each message in a sequence of messages, and the agent may determine that a retransmission request needs to be sent for a given message if the sequence ID number for that message does not appear in the received messages. When requesting retransmission of a message, the agent sets a flag associated with the corresponding message stub in the message queue to indicate that the request has been sent, and further updates a pointer to point to the next message stub for which a retransmission request is to be sent.

In response to receiving a retransmission request, the master node may retransmit the requested message or, if such a retransmission cannot be made, send an acknowledgment message to the agent indicating that the message cannot be retransmitted. For example, when the master node is out of memory and unable to process the retransmission request, the master node may send an out-of-memory acknowledgment message. In response to receiving the acknowledgment message, the agent resets the flag, discussed above, to indicate that a retransmission request needs to be sent (again) and updates the pointer pointing to the next message stub to instead point to the message stub for which the retransmission request needs to be sent again. The agent may then resend the retransmission request after waiting a predefined period of time. The system is thus able to recover from transient retransmission failures, such as out-of-memory conditions, by retrying the retransmission request after the out-of-memory condition passes.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
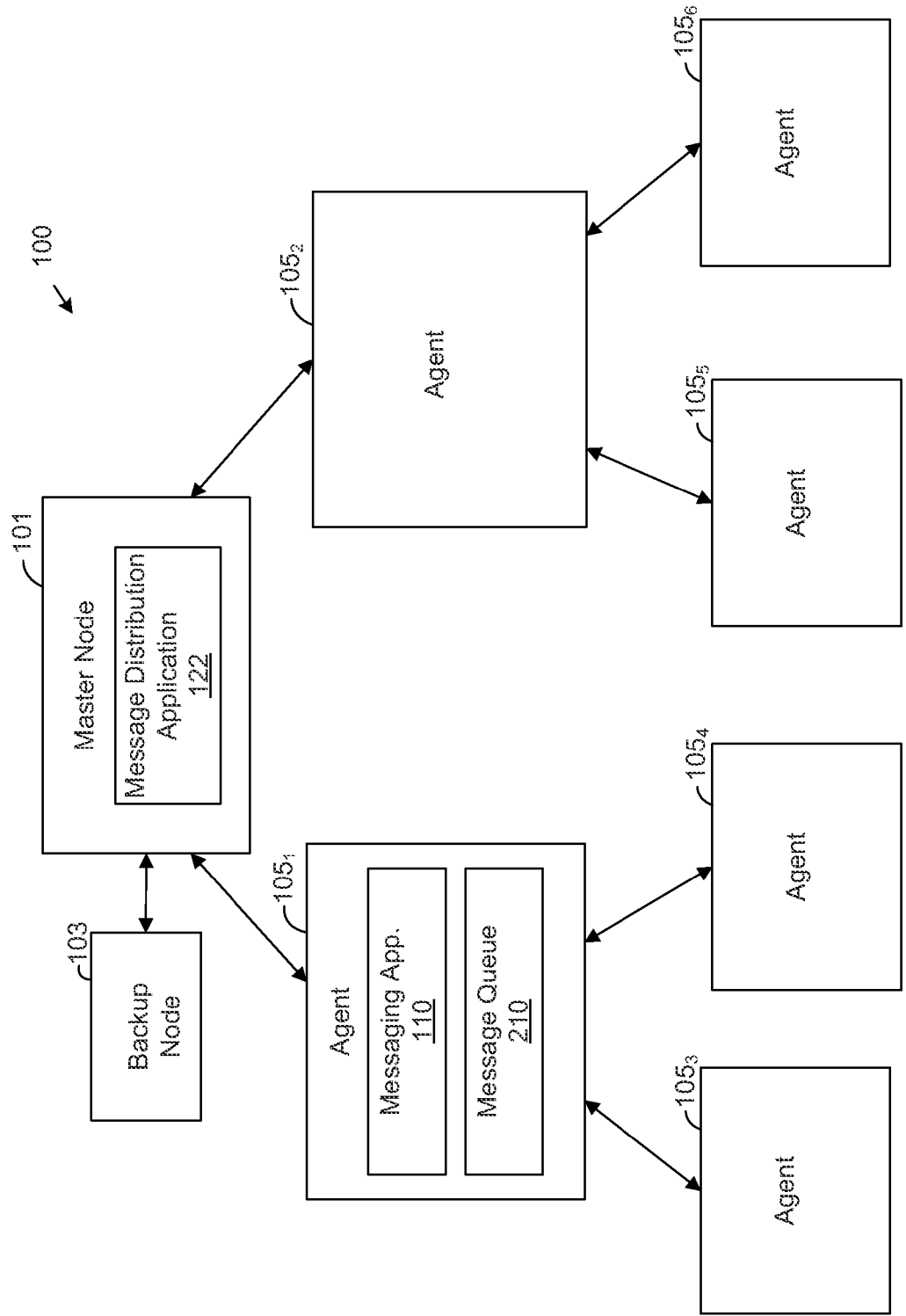
FIG. 1 illustrates a message transmission system, according to an embodiment.

FIG. 1 illustrates a message transmission system 100, according to an embodiment. As shown, the system 100 is a distributed system in which master node 101 is in communication with backup node 103 and with agents $105_{1-2}$, which are themselves in communication with additional agents $105_{3-6}$. Master node 101, backup node 103, and agents $105_{1-6}$ may be constructed on conventional, typically server-class, hardware platforms that include one or more central processing units (CPUs), memory, and network interface cards (NICs), among other things, and may communicate with each other via a network, such as a local area network (LAN) or the Internet.

Master node 101, and more specifically an application 122 running in master node 101, is configured to distribute messages to agents $105_{1-6}$. The messages distributed by master node 101 may contain any feasible data. In a particular embodiment, the messages may be cluster directory information pertaining to the state of a distributed storage area network cluster to which master 101 and agents $105_{1-6}$ belong and the health of disks and nodes in the cluster. The cluster directory stores metadata indicating the health of disks and files, where files are located, among other things, and the messages may include updates to the cluster directory such as adding, deleting, or modifying an entry in the directory. Master 101 may transmit cluster directory information as messages to agents 105$_{1-2}$, and messaging applications running in the agents 105$_{1-2}$ may then relay the messages to the other agents 105$_{3-6}$, thereby providing the nodes with a consistent view of the cluster directory. It should be recognized that references to master node 101 distributing messages, agents 105$_{1-6}$ relaying messages, etc. actually refer to applications running in master node 101 and agents 105$_{1-6}$ that perform the distributing, relaying, etc. Further, although a hierarchical model is shown as an example in FIG. 1, it should be understood that message retransmission system 100 can be implemented in different ways. For example, in an alternative embodiment, agents 105$_{1-6}$ may all be part of the same level and may not communicate with each other.

Messages sent by master node 101 may be placed into a queue (not shown). Periodically, agents 105$_{1-6}$ may report to master node 101 the sequence ID of the last message received and before which there are no missing messages. Master node 101 may then remove the last message and messages before it from the queue of messages, and then populate the queue with other messages to send. For example, if agents 105$_{1-6}$ report that messages up to identifier (ID) number 4 have been received, then master node 101 may remove the messages having sequence ID numbers 1-4 from the queue. Messages sent by master node 101 may further be sent to backup node 103, which is responsible for taking over the functions of master node 101 should master node 101 become unavailable. Backup node 103 may generally share the same data and be synchronized with master node 101.

The channel(s) used to transmit messages to agents 105$_{1-6}$ may be unreliable. For example, message packets may be lost or dropped. In one embodiment, master node 101 is configured to tag each message being sent with a sequence ID number that is monotonically increased for a sequence of messages. In such a case, agents 105$_{1-6}$ are able to determine whether they have received all of the messages in the sequence of messages based on whether any sequence IDs are missing in the messages received. For example, if master node 101 sends out messages with sequence ID numbers 1-4, but the messages received by one of agents 105 includes only messages having sequence ID numbers 3-4, then that agent may determine that messages having sequence ID numbers 1-2 are missing and request retransmission of those messages through a reliable channel. That is, agents 105$_{1-6}$ proactively request that missing messages be retransmitted.

In one embodiment, agent 105 is configured to add a stub for each missing message to a message queue maintained by the agent. Agent 105 may then send message(s) requesting the missing messages to master node 101. Continuing the example in which messages having sequence ID numbers 1-2 are missing, the agent may request retransmission of these messages through a reliable channel. When a retransmission is sent for a given message, the agent 105 may further set a flag associated with the corresponding message stub to indicate that the request has been sent, and update a pointer to point to the next message stub for which a retransmission request is to be sent.

In response to receiving a retransmission request, master node 101 may retransmit the requested message via the reliable channel or, if such a retransmission cannot be made, send an acknowledgment message to the agent indicating that the message cannot be retransmitted. For example, master node 101 may be out of memory or otherwise unable to process the retransmission request, and master node 101 may send an acknowledgment message indicating the issue.

In response to receiving the acknowledgment message, agent 105 resets the flag, discussed above, to indicate that a retransmission request needs to be sent (again) and updates the pointer pointing to the next message stub to instead point to the message stub for which the retransmission request needs to be resent. The agent may then resend the retransmission request after waiting a predefined period of time.

Figure 2:
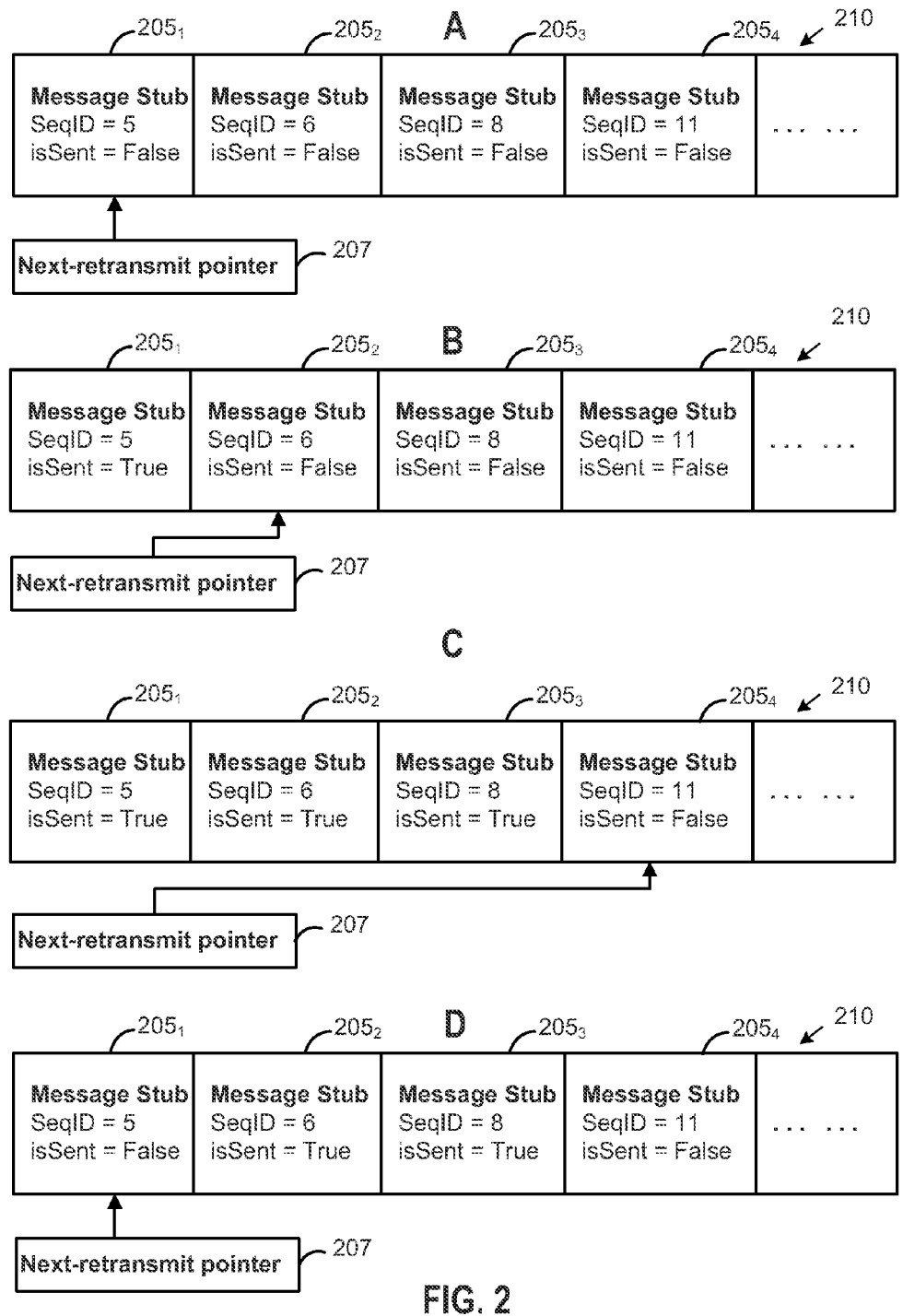
FIG. 2 illustrates an example of handling message retransmission failure cases, according to an embodiment.

FIG. 2 illustrates an example of handling message retransmission failure cases, according to an embodiment. In this example, it is assumed that master node 101 is attempting to transmit a sequence of messages with sequence IDs numbering 1-12 to agent 105. Based on missing sequence IDs, agent 105 has determined that messages having IDs 5-6, 8, and 11 in the message sequence have not been received. In particular, agent 105 may determine that messages with sequence IDs 5-6, 8, and 11 have not been received if agent 105 has only received messages having sequence IDs 1-4, 7, 9-10, and 12.

Agent 105 may add each of the received messages (having sequence IDs 1-4, 7, 9-10, and 12) into a message queue 210. For each of the messages that has not been received (having sequence IDs 5-6, 8, and 11), agent 105 adds a corresponding message stub 205$_i$ to message queue 210, as shown in panel A. As further shown, each message stub 205$_i$ in message queue 210 includes an "isSent" flag. The isSent flag indicates whether a retransmission request has been sent for that message stub 205$_i$. Illustratively, agent 105 also maintains a pointer 207 which points to the next stub in the message queue 210 for which a retransmission request is to be sent.

As shown in panel B, agent 105 sends a retransmission message to master node 101 requesting that message distributing application 122 retransmit the message having sequence ID number 5. Then, agent 105 sets the isSent flag to true for the message stub 205$_1$, indicating that the retransmission request has been sent. In addition, agent 105 updates pointer 207 to point to message stub 205$_2$, which is the next message for which a retransmission request is to be sent. Similarly, panel C shows pointer 207 pointing to message stub 205$_4$, after retransmission requests have been sent for the message stubs 205$_{1-3}$ and their isSent flags set to true.

As shown in panel D, when master node 101 replies with an acknowledgment message indicating that a retransmission message cannot be sent for a message having a given sequence ID and, in such a case, agent 105 updates the isSent flag of the message stub for the given sequence ID to be false again. Setting such a isSent flag to false indicates once again that a retransmission request needs to be sent. In addition, agent 105 updates pointer 207 to point again to message stub 205$_1$ as the next message stub for which a retransmission request is to be sent. Then, after waiting for some period of time, agent 105 may send such a retransmission request.

Figure 3:
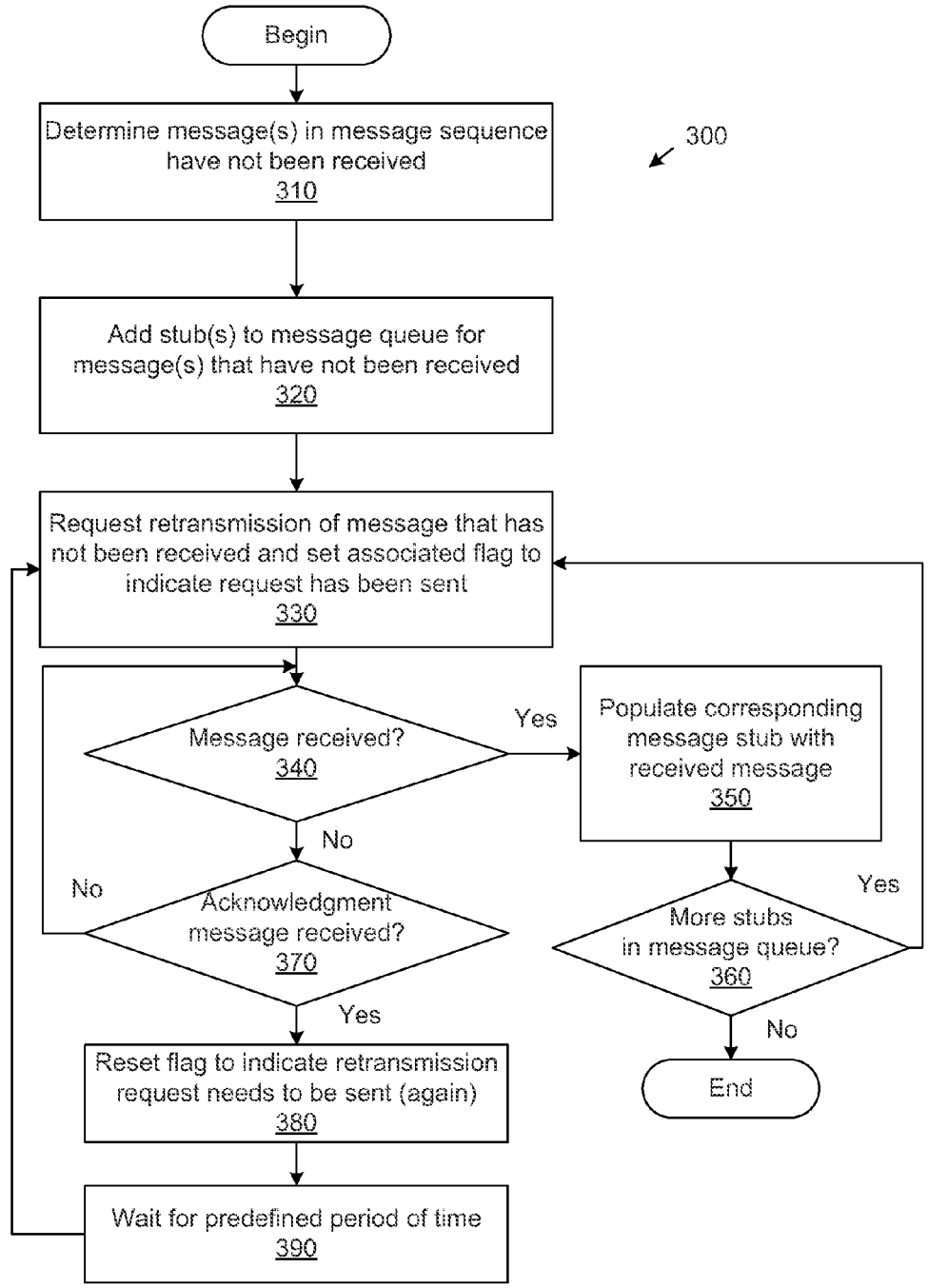
FIG. 3 illustrates a method for message retransmission, according to an embodiment.

FIG. 3 illustrates a method 300 for message retransmission, according to an embodiment. As shown, the method 300 begins at step 310, where agent 105 determines that a message in a sequence of messages has not been received. In one embodiment, each message in the message sequence may be identified by a sequence ID number that is monotonically increased. For example, the first message may be tagged with sequence ID 1, the second message may be tagged with sequence ID 2, etc. In such a case, agent 105 may determine that a message has not been received if a message with the associated sequence ID number is missing, an example of which is discussed above with respect to FIG. 2.

At step 320, agent 105 adds, to message queue 210, a stub corresponding to the message that has not been received. That is, agent 105 allocates memory for the missing message and creates a corresponding stub in message queue 210. The stub may later be populated with the actual message after the message is successfully received.

At step 330, agent 105 requests retransmission of a message that has not been received via a reliable channel and sets a flag for the message stub in the message queue to indicate the retransmission request has been sent. For example, the flag may be the Boolean "isSent" flag, discussed above, that agent 105 sets to true after the retransmission message is sent. In addition, agent 105 may also update pointer 207, which points to the next message stub for which a retransmission request needs to be sent, to point to another message stub.

At step 340, if agent 105 receives the retransmitted message in response to its request, then agent 105 populates the corresponding message stub corresponding to the message with the received message at step 350. Then, at step 360, agent 105 determines whether there are additional message stubs in message queue 210. If there are more messages in retransmission queue 210, then the method 300 returns to step 330, where agent 105 requests retransmission of another message that has not been received. On the other hand, if there are no more message stubs in message queue 210, or if there is some sequence of messages with no missing messages in between, then agent 105 may relay those messages in the message queue to other agents, thereby propagating the messages to the other agents. In addition, agent 105 may make appropriate use of the messages. For example, where the messages pertain to a distributed storage area network cluster directory, agent 105 may update its copy of the cluster directory with data contained in the messages.

At step 370, if agent 105 receives an acknowledgment message that the requested message cannot be sent because, e.g., master node 101 is out of memory and unable to process the retransmission request, then agent 105 resets the flag for the corresponding message stub to indicate that a retransmission request needs to be sent at step 380. For example, if the flag is the "isSent" flag, discussed above, that has been set to true after the initial retransmission request, then agent 105 may reset the isSent flag back to false. In addition, agent 105 may update pointer 207, to point again to the message stub for which the acknowledgment message was received.

In another embodiment, agent 105 may reset isSent flags of message stubs back to false when master node 101 becomes unavailable and agent 105 must request retransmission from backup node 103. Setting the isSent flag back to false indicates that retransmission requests need to be sent (to backup node 103) for those message stubs.

At step 390, agent 105 waits for a predefined period of time, and the method 300 then returns to step 330, where agent 105 again requests retransmission of the message that has not been received. More specifically, agent 105 requests retransmission of the message indicated by pointer 207, which as discussed would point to the message stub for which the acknowledgment message was received as a result of retransmission failure.

Figure 4:
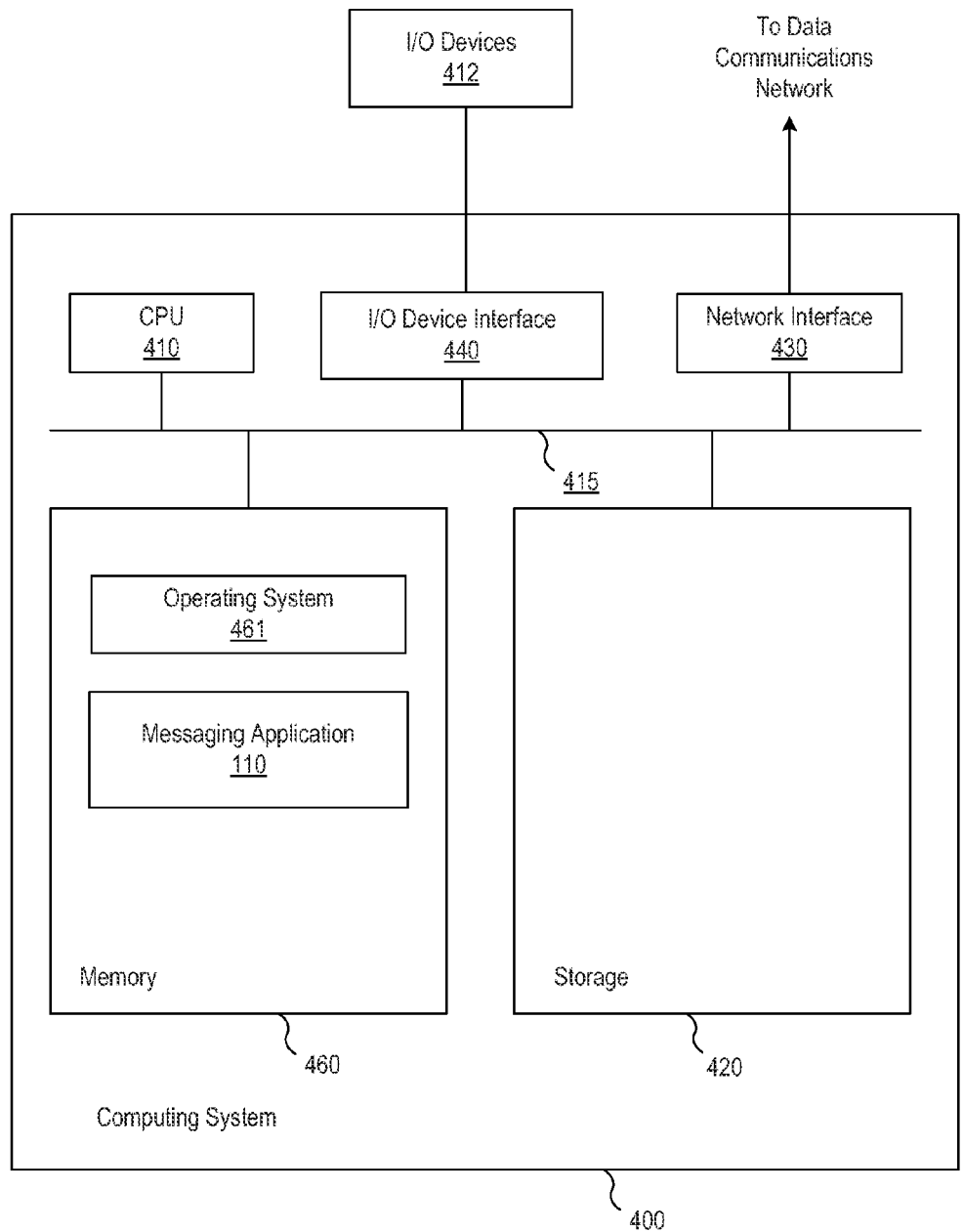
FIG. 4 illustrates a system in which an agent may be implemented, according to an embodiment.

FIG. 4 illustrates a system 400 in which agent 105 be implemented, according to an embodiment. As shown, system 400 includes, without limitation, a central processing unit (CPU) 410, a network interface 430, an interconnect 415, a memory 460 and storage 420. System 400 may also include an I/O device interface 440 connecting I/O devices 450 (e.g., keyboard, display and mouse devices) to the system 400.

CPU 410 retrieves and executes programming instructions stored in the memory 460. Similarly, CPU 410 stores and retrieves application data residing in the memory 460. Interconnect 415 facilitates transmission, such as of programming instructions and application data, between CPU 410, I/O device interface 440, storage 420, network interface 430, and memory 460. CPU 410 is included to be representative of a single CPU, multiple CPUs, a single CPU having multiple processing cores, and the like. And memory 460 is generally included to be representative of a random access memory. Storage 420 may be a disk drive storage device. Although shown as a single unit, storage 420 may be a combination of fixed and/or removable storage devices, such as fixed disc drives, floppy disc drives, tape drives, removable memory cards or optical storage, network attached storage (NAS), or a storage area-network (SAN). Further, system 400 is included to be representative of a physical computing system as well as virtual machine instances hosted on a set of underlying physical computing systems. Further still, although shown as a single computing system, one of ordinary skill in the art will recognized that the components of system 400 shown in FIG. 4 may be distributed across multiple computing systems connected by a data communications network.

As shown, memory 460 includes an operating system 461 and agent 105. Operating system 121 may be, e.g., Linux®. Messaging application 110 is configured to receive and relay messages, as well as make retransmission requests, as appropriate. In one embodiment, messaging application 110 may determine that message(s) in a sequence of messages have not been received, add stub(s) to a message queue for the messages that have not been received, request retransmission of the message(s) that have not been received and set flag(s) to indicate that the retransmission requests have been sent, reset the flags to indicate that retransmission requests need to be sent again if acknowledgment messages are received from master node 101 indicating retransmission failure, and resend the retransmission requests after waiting for a period of time, according to the method 300 discussed above with respect to FIG. 3.

Advantageously, techniques disclosed herein provide robustness to retransmission failures, such as out-of-memory failures. When such a failure is encountered, the master node sends an acknowledgment message indicating the failure and, in response, the agent resets a flag for the corresponding message to indicate that a retransmission request needs to be sent to the master again. The system is thus able to recover from transient retransmission failures by resending the retransmission request. Further, the agent is not required to leave and rejoin the cluster again, in contrast to some other approaches in which the agent is made to rejoin the cluster and receive a snapshot of, e.g., the current cluster directory, resulting in large network traffic.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method for a receiving application to request message retransmission, comprising:
   determining that a first message in a sequence of messages has not been received;
   adding, to a message queue, a stub corresponding to the first message that has not been received;
   requesting retransmission of the first message from a transmitting application;
   setting a flag associated with the stub corresponding to the first message to indicate that the request for retransmission of the first message has been sent to the transmitting application; and
   responsive to receiving, from the transmitting application, a second message indicating the first message cannot be retransmitted, resetting the flag to indicate that another retransmission request needs to be sent to the transmitting application to request the first message.

2. The method of claim 1, further comprising:
   maintaining a pointer to a next stub in the message queue for which a retransmission request is to be sent,
   wherein, when the flag is reset to indicate that another retransmission requests needs to be sent requesting the first message, the pointer is updated to point to the stub corresponding to the first message.

3. The method of claim 1, further comprising, if the second message is received and the flag is reset, resending the request for retransmission of the first message.

4. The method of claim 1, wherein the second message is an out-of-memory acknowledgment message.

5. The method of claim 1,
   wherein each message in the sequence of messages is associated with a sequence identifier (ID) number, the sequence ID number being monotonically increased, and
   wherein determining that the first message has not been received includes identifying that no message with a corresponding sequence ID number has been received.

6. The method of claim 1, further comprising:
   if the first message is received in response to the request for retransmission of the first message, populating the stub corresponding to the first message with the received first message.

7. The method of claim 1, further comprising:
   determining that a master node to which the request for retransmission of the first message was sent is unavailable; and
   resetting the flag to indicate that another retransmission request requesting the first message needs to be sent to a backup node.

8. The method of claim 1, wherein the messages in the sequence of messages specify updates, additions, and/or deletions of entries in a metadata directory for a distributed storage area network cluster.

9. A non-transitory computer-readable storage medium storing a receiving application program which, when executed by one or more processors, performs operations for the receiving application to request message retransmission, the operations comprising:
   determining that a first message in a sequence of messages has not been received;
   adding, to a message queue, a stub corresponding to the first message that has not been received;
   requesting retransmission of the first message from a transmitting application;
   setting a flag associated with the stub corresponding to the first message to indicate that the request for retransmission of the first message has been sent to the transmitting application; and
   responsive to receiving, from the transmitting application, a second message indicating the first message cannot be retransmitted, resetting the flag to indicate that another retransmission request needs to be sent to the transmitting application to request the first message.

10. The computer-readable storage medium of claim 9, the operations further comprising:
maintaining a pointer to a next stub in the message queue for which a retransmission request is to be sent,
wherein, when the flag is reset to indicate that another retransmission requests needs to be sent requesting the first message, the pointer is updated to point to the stub corresponding to the first message.

11. The computer-readable storage medium of claim 9, the operations further comprising, if the second message is received and the flag is reset, resending the request for retransmission of the first message.

12. The computer-readable storage medium of claim 9, wherein the second message is an out-of-memory acknowledgment message.

13. The computer-readable storage medium of claim 9,
wherein each message in the sequence of messages is associated with a sequence identifier (ID) number, the sequence ID number being monotonically increased, and
wherein determining that the first message has not been received includes identifying that no message with a corresponding sequence ID number has been received.

14. The computer-readable storage medium of claim 9, the operations further comprising:
if the first message is received in response to the request for retransmission of the first message, populating the stub corresponding to the first message with the received first message.

15. The computer-readable storage medium of claim 9, the operations further comprising:
determining that a master node to which the request for retransmission of the first message was sent is unavailable; and
resetting the flag to indicate that another retransmission request requesting the first message needs to be sent to a backup node.

16. The computer-readable storage medium of claim 9, wherein the messages in the sequence of messages specify updates, additions, and/or deletions of entries in a metadata directory for a distributed storage area network cluster.

17. A system, comprising:
a processor; and
a memory, wherein the memory includes a receiving application program configured to perform operations for the receiving application to request message retransmission, the operations comprising:
determining that a first message in a sequence of messages has not been received,
adding, to a message queue, a stub corresponding to the first message that has not been received,
requesting retransmission of the first message from a transmitting application,
setting a flag associated with the stub corresponding to the first message to indicate that the request for retransmission of the first message has been sent to the transmitting application, and
responsive to receiving, from the transmitting application, a second message indicating the first message cannot be retransmitted, resetting the flag to indicate that another retransmission request needs to be sent to the transmitting application to request the first message.

18. The system of claim 17, the operations further comprising:
maintaining a pointer to a next stub in the message queue for which a retransmission request is to be sent,
wherein, when the flag is reset to indicate that another retransmission requests needs to be sent requesting the first message, the pointer is updated to point to the stub corresponding to the first message.

19. The system of claim 17, the operations further comprising, if the second message is received and the flag is reset, resending the request for retransmission of the first message.

20. The system of claim 17, wherein the second message is an out-of-memory acknowledgment message.

* * * * *